Jan. 12, 1954

A. L. BONNER

LOSS MEASUREMENT IN TWO-WAY ELECTRICAL TRANSMISSION SYSTEMS 2,666,099

Filed June 20, 1950

4 Sheets-Sheet 1

INVENTOR
A. L. BONNER
BY N. S. Ewing
ATTORNEY

Jan. 12, 1954

A. L. BONNER

LOSS MEASUREMENT IN TWO-WAY ELECTRICAL TRANSMISSION SYSTEMS 2,666,099

Filed June 20, 1950

4 Sheets-Sheet 2

INVENTOR
A. L. BONNER
BY
N. S. Ewing
ATTORNEY

INVENTOR
A. L. BONNER
BY
N. S. Ewing
ATTORNEY

Jan. 12, 1954

A. L. BONNER

LOSS MEASUREMENT IN TWO-WAY ELECTRICAL TRANSMISSION SYSTEMS 2,666,099

Filed June 20, 1950

4 Sheets-Sheet 4

INVENTOR
A. L. BONNER
BY N. S. Ewing
ATTORNEY

Patented Jan. 12, 1954 2,666,099

UNITED STATES PATENT OFFICE 2,666,099

LOSS MEASUREMENT IN TWO-WAY ELECTRICAL TRANSMISSION SYSTEMS

Arthur L. Bonner, Chatham, N. J., assignor to Bell Telephone Laboratories, Incorporated, New York, N. Y., a corporation of New York Application June 20, 1950, Serial No. 169,165

13 Claims. (Cl. 179—175.3)

This invention relates in general to electrical transmission systems and more particularly to methods and apparatus applicable in such systems to the measurement of transmission loss in both directions through a two-way toll transmission circuit.

To maintain toll telephone circuits in proper operating condition it is necessary to measure circuit transmission loss accuratley, frequently and with minimum interruption of service. The loss must be measured in both directions of transmission, for the loss in one direction will generally not be the same as that in the opposite direction. This may be understood on considering the fact that between terminal switching stations, where the circuit appears as a two-way two-wire circuit, the circuit may take the form, for example, of a four-wire system, carrier or non-carrier, with separate repeatered paths for each direction of transmission. Present practice requires the cooperative effort of attendants at two terminal stations, which has the disadvantage of limiting the opportunities for making measurements and of increasing the likelihood of error. Further difficulties are encountered where one of the terminal stations, although provided with automatic switching equipment, has no test attendant.

It is, therefore, a principal object of the present invention to simplify the measurement of the loss in both directions between a first and second terminal station; and more specifically to provide for such measurement with a minimum number of attendants.

In accordance with the present invention the two-way measurement of loss of a signal transmission circuit extending between a first terminal station A and a second terminal station B provided with automatic switching equipment is carried out in two substantially concurrent steps. One step is to transmit from, say, station A dial pulses, or other signals, that are operative on the automatic switching equipment at station B to cause a tone of predetermined fixed strength to be applied at B to the circuit under test. The strength of this tone as received at station A is measured, and the change in strength over the strength of the tone applied at B is taken as a measure of the transmission loss from B to A. The other step involves dialing at A to effect connection of special test equipment to the circuit at B, transmission of a tone of predetermined fixed strength over the circuit from A to B, the return of a tone from B the strength of which is automatically adjusted in predetermined relation to the strength of the tone received at B, and measurement of the strength of the returned tone at A. The last-mentioned measurement enables determination of the sum of the respective losses in the two directions of transmission (which may be called the "round-trip loss"), so that by subtraction of the measured B to A loss, the loss in the A to B direction can be determined. Inasmuch as the first-mentioned step conforms with well-known practice this specification will be devoted largely to a description of the second-mentioned step, i. e., the measurement of "round-trip" loss.

In accordance with one embodiment of the invention, a tone of given frequency, say 1,000 cycles, having a fraction of a second duration, is transmitted at predetermined fixed strength from station A to station B where the strength of the received tone is used to adjust the loss of a vario-losser circuit to correspond to the A to B loss of the circuit. After the sending tone has been removed from station A, the vario-losser setting is maintained for a short period by a holding circuit. The adjusted vario-losser is then used to control the magnitude of another test tone of the same frequency and of slightly longer duration which is transmitted from station B back to the station A where it is measured by a transmission measuring set which has been substituted for the test tone source at station A. Inasmuch as the power level of the tone transmitted from station B is below that which was originally transmitted from the station A by the amount of the A to B loss of the circuit, assuming that the generated tones at both stations are of the same predetermined fixed strengths, the receiving equipment at station A can be calibrated to indicate the round-trip loss between stations A and B in terms of the received power level. Assuming that the B to A loss has been determined by means of a tone dialed up at station B, and transmitted from B to A, the A to B loss may easily be computed.

In accordance with a second embodiment of the invention, the round-trip loss is measured by transmitting a sustained tone of given frequency from station A which is frequency shifted at station B before being transmitted back again to station A. Assuming that a 900-cycle test tone is transmitted from station A, it is converted at station B to a 1,000-cycle tone and again returned to station A. The conversion apparatus at station B is designed to have a zero loss; hence, the difference between the transmitted and received powers at station A represents the round-trip loss of the circuit.

The invention will be better understood from a detailed study of the specification hereinafter with specific reference to the attached drawings in which:

Fig. 1 shows a typical circuit adaptable for testing in accordance with the present invention;

Fig. 2 indicates the contemplated relationship of the test apparatus of the present invention to conventional automatic telephone switching equipment and the connecting wire channels between two toll telephone switching centers.

Figure 1:
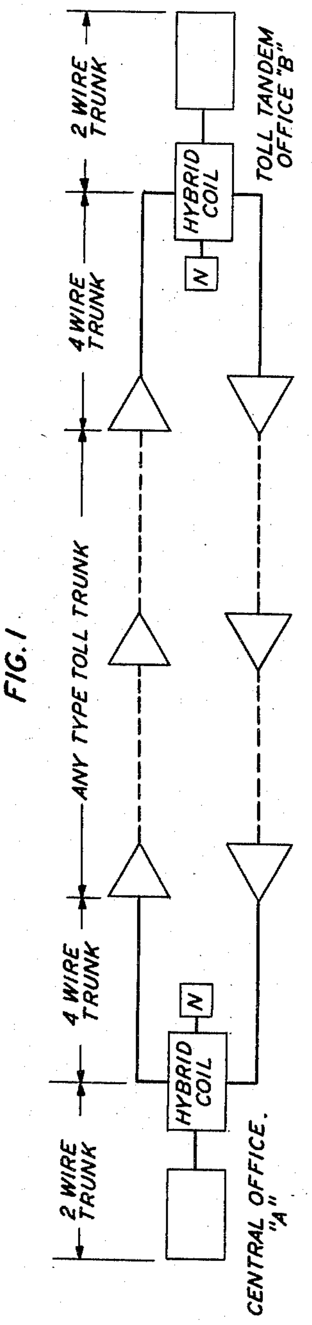

Referring now to Fig. 1 of the drawings, there is indicated a typical toll circuit of the type to which application of the present invention is contemplated. The circuits which serve to interconnect a pair of switching centers represented by a central office A and a toll tandem office B comprise two-wire trunks at the terminals, which in general feed through some type of interconnecting hybrid junctions to four-wire repeatered circuits which provide for separate transmission in the two directions. The interconnecting toll trunk lines between the two terminal sections may take various forms, including carrier and non-carrier circuits, some comprising four-wire circuits providing separate transmission in the two directions, and others comprising two-wire circuits in which the principal transmission path differences in the two directions occur in passing through the repeaters.

Figure 2:
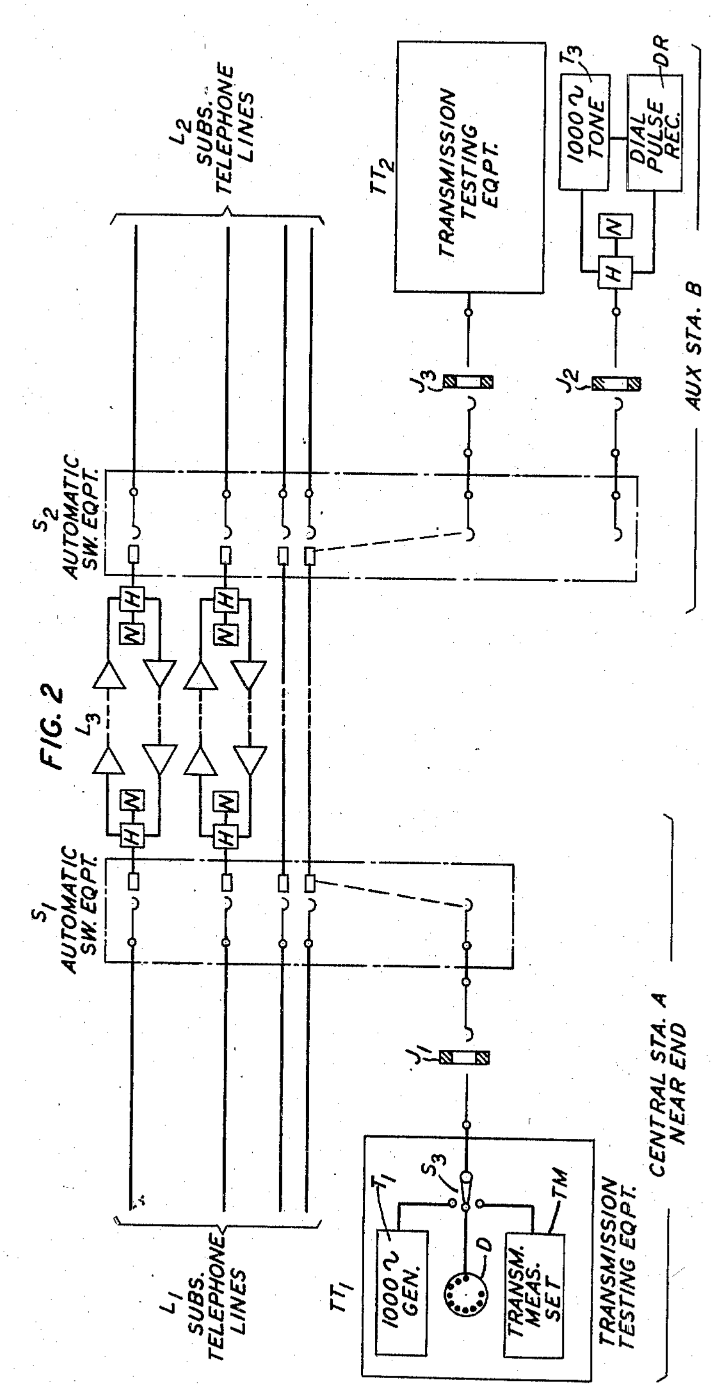

Referring in detail to Fig. 2 of the drawings, the central office A serves as the terminating point for a plurality of subscribers' lines $L_1$; whereas, the toll tandem office B serves as the terminating point for a plurality of different subscribers' lines $L_2$. A plurality of toll trunk lines $L_3$ are provided for completing the subscribers' circuits between points A and B through the mechanisms of the automatic stepping selectors $S_1$ and $S_2$, which may be assumed to be any of the types well known in the art which are ordinarily associated with telephone switching.

The testing equipment in accordance with the present invention can be applied to numerous different types of telephone systems such as described with reference to Fig. 1. For the purposes of illustration, the trunk lines $L_3$ will be assumed to be a repeatered four-wire circuit which feeds into two-wire circuits at the terminals.

It is contemplated that the testing equipment in accordance with the present invention will be plugged into the terminal installations at stations A and B as indicated in Fig. 2 in such a manner as to make connections through the automatic switching equipments $S_1$ and $S_2$ for testing the trunk lines $L_3$. At station A the transmission testing equipment $TT_1$ may comprise a 1-milliwatt tone source $T_1$, a dial D, and a transmission measuring set TM. In accordance with one embodiment of the invention, each of these elements is connected to a different terminal of a triple throw switch $S_3$, the armature of which is connected through the plug and jack $J_1$ to one of the steps of the automatic switching selectors $S_1$. At station B, transmission testing equipment $TT_2$, corresponding to $TT_1$ at station A, is connected to one of the steps on the automatic switching selector $S_2$, through the plug and jack $J_3$. The transmission test equipment $TT_2$ functions to receive the tone transmitted from station A to station B, and transmit a tone from station B to station A having the same power level as the tone received at station B. This tone is then received at station A and measured by the transmission measuring set TM which is calibrated to read the round-trip loss between A and B. The details of the test equipment $TT_2$ will be described in detail hereinafter with reference to Figs. 3, 4A, and 5 which show two different embodiments of the invention.

Another step of switching selector $S_2$ at station B is connected through the plug and jack $J_2$ to a circuit which includes the dial pulse receiver DR responsive to tone transmitted from the dial D at station A. This receiver DR is connected to initiate the operation of a second tone generator $T_3$. Thus, in a manner well known in the art, when the dial D is connected to transmit dial signal from station A, the pulse is received by the dial pulse receiver DR, assuming the jack and plug $J_2$ is connected at station B. This in turn actuates the dial tone generator $T_3$ to transmit a tone of predetermined strength, from B to A, which is received and measured in the transmission measuring set TM, calibrated to show the B to A loss. This value then can be subtracted from the measurement of round-trip loss to determine the one-way loss from A to B.

Let us now refer in detail to Fig. 3 of the drawings which shows a preferred arrangement of transmission testing equipment for measuring loss in accordance with the present invention, which may be applied for testing trunk lines between two telephone switching centers in a manner described with reference to Fig. 2. In accordance with this embodiment of the invention, the test signal is a tone of short duration traveling first in one direction and then in the other. As in the foregoing description, A and B will be used to designate typical central and toll-tandem switching centers.

Figure 3:
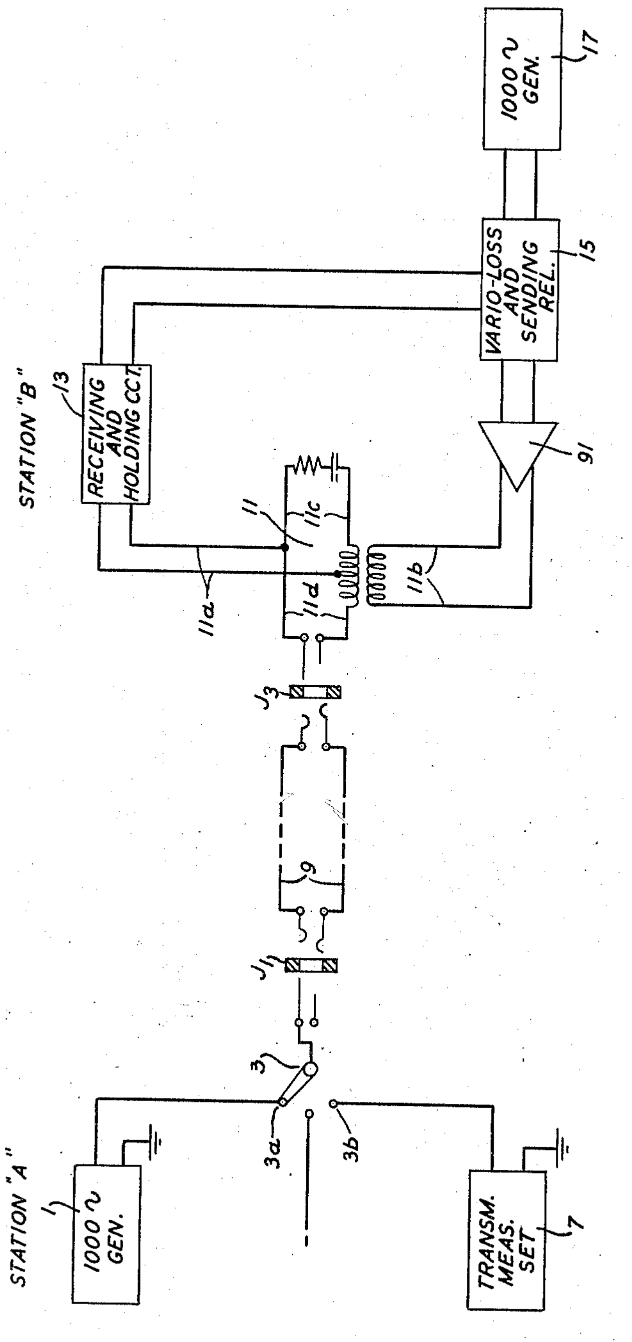
Fig. 3 shows an embodiment of the invention utilizing a tone of short duration transmitted from station A which is received at station B and utilized to control the amplitude of second short tone of the same frequency transmitted back to station A.

Referring to Fig. 3 assume that a two-way transmission circuit 9 connecting these two stations is to be tested. For simplifying the discussion that follows, the telephone switching circuits are assumed to be included in the two-way circuit 9, only the schematic of the testing circuits being indicated as connectable into the telephone circuits through the jacks $J_1$ and $J_3$ at the respective terminals. At station A, a generator 1 of a spurt of tone having a duration of a fraction of a second, and a frequency which in the present illustrative embodiment will be assumed to be 1000 cycles, is connected through a three-terminal switch 3 corresponding to switch $S_3$ in Fig. 2. With the switch in position 3*a*, the generator 1 is connected across the line 9; and with the switch in position 3*b*, the transmission measuring set 7 is substituted for generator 1. Transmission measuring set 7 may take the form of any of the types of loss measuring equipment well known in the art. Accordingly when the switch 3 is in position 3*a*, the line 9 is conditioned to receive the 1,000-cycle tone from the generator 1; and when the switch 3 is in position 3b the transmission measuring set 7 is connected to receive output currents from the line 9.

At the other terminal station, B, equipment is connected for receiving the single frequency spurt of tone generated at station A and for controlling the amplitude of a slightly longer spurt of tone of the same frequency which is transmitted in the opposite direction from station B to station A.

The hybrid coil 11 comprising conjugate pairs of arms 11a, 11b, and 11c, 11d serves to connect the transmitting and receiving branches of the circuit to the line 9 at station B. The receiving and holding equipment 13 which is connected to receive input signals through the terminals 11a of the hybrid coil 11, operates through its various components to control the operation of the vario-losser and sending relay circuit 15, which in turn control the amplitude and duration, respectively of a second 1,000-cycle tone which is transmitted from the tone generator 17 and is impressed on the line 9 through the terminals 11b, 11d of the hybrid coil 11 for transmission in a reverse direction from station B to station A.

The circuit connections of the equipment of station B will now be described in detail with reference to Figs. 4A and 4B of the drawings, which show the components thereof in detailed schematic. The operation of these circuits will be described hereinafter. Connected across the input terminals 11a of the hybrid junction 11, is a control circuit 21 which comprises a conventional amplifier 31 characterized by an input impedance of approximately 600 ohms and a low impedance output, and which is designed to have a gain of approximately 30 decibels. The output terminals of the amplifier 31 are connected through a rectifying circuit 33 which may comprise, for example, a copper oxide varistor having four arms connected in bridge relation, each of which arms includes four three-sixteenths of an inch copper oxide discs. The output of the rectifying circuit 33 is impressed across the 25,000-ohm resistor 35, across which it develops a potential which is impressed on the input terminals of the holding circuit 25 through the contacts 37a of the relay 37 when relay 37 has been operated by relay circuit 23 and relay 65, as will be described hereinafter.

In parallel with the control circuit 21 across the terminals 11a of the hybrid junction 11, is connected the relay amplifier-rectifier circuit 23. This includes the input transformer 39, which preferably has an impedance ratio of 600 to 700,000, and across whose secondary is connected the 700,000-ohm potential divider 41. An adjustable slider in contact with the potential divider 41 is connected to the control grid of the power pentode 47, the rectified output current from which is utilized to drive the relay 65. The pentode 47 includes a cathode connected to ground through the 600-ohm resistance element 51, a suppressor grid directly connected to its cathode, and a plate which is coupled through the output transformer 55 and the rectifying circuit 63 to the energizing windings of the relay 65. The transformer 55, which preferably has an impedance ratio of 20,000 to 50, has one of the terminals of its primary coil connected to the plate of the pentode 47, and the other terminal connected to 130-volt plate battery 54 and to its screen grid through the 33,000-ohm resistor 59, a path to ground being provided from the screen grid through the 0.5-microfarad condenser 61. The rectifier circuit 63 may, for example, comprise a copper oxide varistor which has four arms in bridge connection, each arm comprising two three-quarter inch discs.

The relay 65, bias for which is furnished by the potential source 66 operating through the current limiting resistor 62 is preferably polarized in order that it may operate on the low power furnished from the amplifier pentode 47 and the associated output transformer 55. The relay amplifier-rectifier circuit 23, as described, is designed to furnish a current of about ten mils into the 200-ohm relay 65, assuming that the power received at the input terminals to the office B is about 22 decibels below one milliwatt. If it is desired to measure wire losses greater than 22 decibels, a non-sensitive form of the relay 65 may be used. Relays are available which will operate on a current of about two mils corresponding to an input power of about 36 decibels below one milliwatt.

The relay 65 is designed so that when operated it makes contact 65a which completes a circuit including the energizing coil of the relay 37, the normally closed contact 39a of the relay 39, and the source of potential 40. The relay 37 having the normally closed contact 37b, and the normally opened contact 37a, is a general utility relay which has no specialized requirement. The contact 37a of the relay 37 is connected to impress the rectified direct-current potential drop across the resistor 35, across the input terminals of the holding circuit 25. The contact 37b of the relay 37 connects ground to a parallel circuit, one branch of which includes the relay 69 and its energizing source 70 and the other branch of which passes through the delay circuit 68 to energize the slow-operating relay 71, through the source 72. The slow-operate relay 71 is preferably of a type constructed with a copper sleeve, providing a release time which is slower than that of the relay 69.

Figures 4A, 4B:
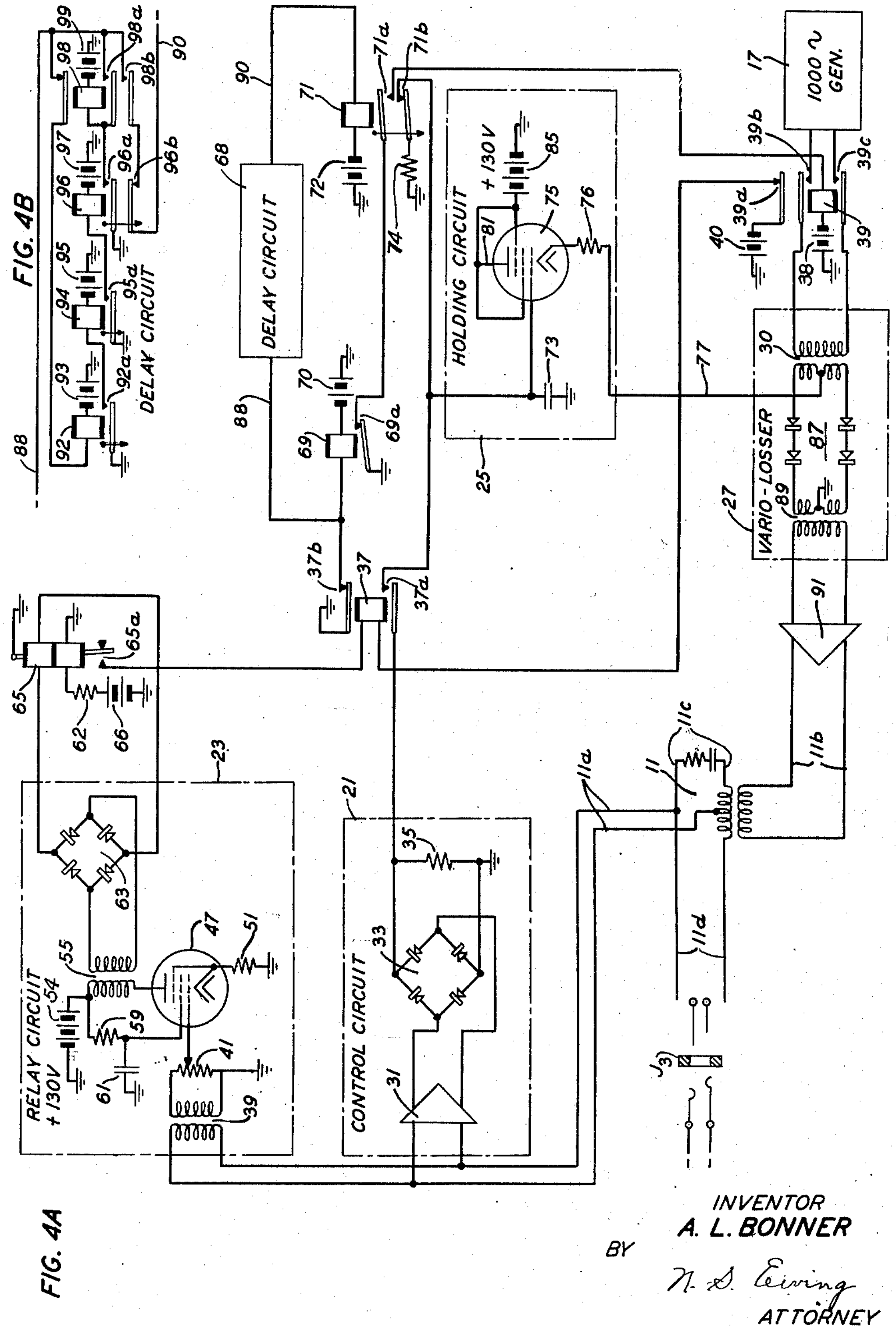
Fig. 4A shows a detailed schematic of the circuit arrangement at station B in the system of Fig. 3.
Fig. 4B shows details of a typical delay circuit represented by block diagram 68 in the circuit of Fig. 4A.

A form which the delay circuit 28 may assume is shown in detail in the illustrative diagram of Fig. 4B. This includes the relay 92, energized by the source 93, the relay 94 energized by the source 95, the relay 96 energized by the source 97, and the relay 98 energized by the source 99. It will be noted that the path between the input and output leads 88 and 89 of the delay circuit 68 passes through the normally closed contact 96b of the relay 96, and the normally opened contacts 98b of the relay 98, so that the relay 96 must be released and the relay 98 must be operated in order that the path be closed. When ground, through contact 37b, is applied to the input terminal of the delay circuit 68, the relays 92, 94, 96 and 98 are operated in succession. The series path between the input and output leads 88 and 89 is then opened at the contacts 96b of the relay 96 and closed at the contacts 98b of the relay 98. In addition, the relay 98 is locked up under control of its own contacts 98a and contacts 37b of relay 37 and the operating path of the slow-release relays 92, 94, and 96 is opened at the uppermost contacts of relay 98. The relays 92, 94 and 96 then successively release, the release of the relay 96, through contacts 96b completing the path between the input and the output leads to 88 and 89 of the delay circuit 68. The time delay obtained by the operation and release of these relays is approximately 1.8 seconds, thus providing a delay which is sufficient for either visual reading of a type of meter commonly used in transmission measuring sets, or for the mechanical setting of a lock-up type of meter in which the meter needle is locked by a relay.

As has been explained, the purpose of the control equipment at station B is to receive power from the station A, to store information regarding the level of the received power, to set the gain of the vario-losser circuit 27 accordingly, and to transmit back to station A a tone indicating the level of tone received from station A when the tone from the station A is removed. The storing of information and the setting of circuit 27 are accomplished by means of the control circuit 21, and the amplifier-rectifier circuit 23, operating in conjunction with the holding circuit 25, which functions to maintain the loss of the vario-losser 27 for a few seconds after the control tone from station A is removed, whereby the control current flowing in the vario-losser circuit may be maintained at a desired value. The holding circuit 25 includes the 4-microfarad condenser 73 across the high impedance input terminals to the control grid of pentode 75. An alternative biasing connection for the control grid passes through the normally operated contacts 71*b* of the relay 71 to ground through the 1,000-ohm resistor 74. The suppressor, plate and screen grids of the tube 75 are connected together to the energizing 130-volt potential source 85. The 2,000-ohm cathode resistor 76 is connected to the center tap of the transformer 30 in the vario-losser circuit 27.

The cathode-follower circuit 25 described above is designed to give a cathode current which is very nearly proportional to the voltage impressed across the grid by the condenser 73. The elements of the control circuit 21, and the amplifier and rectifier circuits 23 have been designed to produce enough voltage across the condenser 73 to permit the use of the high cathode resistance 76, whereby a substantially linear voltage current relationship is obtained in the cathode follower circuit 25 including the pentode 75.

Tone for return transmission from station B to station A is derived from a conventional 1,000-cycle generator 17 which is connected under control of the normally released contacts 39*b* and 39*c*, of the general utility sending relay 39, to the input terminals of the vario-losser circuit 27 through the terminals of the balanced step-up transformer 30 having a preferred impedance ratio of 600–200. Relay 39 is energized by the battery 38 through a circuit which includes the normally closed contact 69*a* of the relay 69, and the normally opened contact 71*a* of the slow-operate relay 71.

The vario-losser circuit 27 is of the general type described in an article entitled "Vario Losser Circuits" by W. R. Bennett and S. Doba published in the Transactions of the American Institute of Electrical Engineers, volume 60, pages 17 through 32, January 1941. It may comprise, for example, four copper oxide varistors, one pair connected in series between the upper terminals and the other pair connected in series between the lower terminals of the secondary coil of the input transformer 30 and the primary coil of the substantially similar output transformer 89. Each one of the varistors of the circuit 87 may comprise, for example, four three-sixteenth of an inch copper discs. As described above the center tap of the input transformer 30 is connected through lead 77 to the control current from the holding circuit 25.

Connections from the output transformer 89 are made through the amplifier 91 to terminals 11*b* of the hybrid coil 11 for the purpose of compensating the three-decibel loss sustained through the hybrid coil 11, and the loss of approximately 13 decibels sustained through the vario-losser circuit 27 when the input power impressed on terminals 11*d* of the hybrid coil is zero decibels below one milliwatt. This assumes that the line 9 of Fig. 3 has zero loss.

Operation of the circuit of Fig. 3 and Fig. 4A, indicating the details of station B, which have been structurally described in the foregoing paragraphs, is as follows. When a 1,000-cycle tone from the generator 1 at office A is applied through the contact 3*a* of the switch 3 to a selected test line 9, the tone received at the office B passes through the hybrid junction 11 producing a voltage across its terminals 11*a* which is rectified by the control circuit 21 to produce a voltage drop across the resistor 35. Simultaneously the tone received at office B is also applied through the terminals 11*a* of the hybrid coil 11 to the relay circuit amplifier-rectifier 23, the rectified output from which operates a sensitive relay 65 by overcoming the bias. The relay 65 in turn operates relay 37 to engage its contact 37*a* thereby impressing the voltage drop developed across resistance 35 and hence across the plates of condenser 73, to the control grid in the cathode-follower pentode 75 of the voltage storing holding circuit 25.

Normally, relays 69, 93 and 71 are in an energized condition, so that the operation of the relay 37 opening its contacts 37*b* to ground causes these relays to release. Since the relay 71 has a copper sleeve, it will accordingly release more slowly than relay 69, and hence the sending relay 39 will not be operated.

When sufficient time has elapsed to charge the condenser 73, the generator 1 producing the 1,000-cycle tone at the office A may be replaced by a transmission measuring set 7, either by manual operation of the switch 3 to engage its contact 3*b* or by some automatic means. A typical charging time for the condenser 73 is about 0.3 second.

After the generator 1 has been replaced by the transmission measuring set 7 at station A, the following operations occur at station B. The relays 65 and 37 release, thereby operating relay 69 which, in turn, operates the sending relay 39 through the contacts 69*a* of relay 69 and 71*a* of the slow-operate relay 71, operation of which is delayed by the presence of the delay circuit 68. The sending relay 39 will remain operated until the slow-operate relay 71 operates after an interval of about 1.8 seconds.

Simultaneously, with the impression of the 1,000 cycle tone on the relay circuit amplifier-rectifier 23, the 1,000-cycle tone from station A is also amplified and rectified in control circuit 21, impressing a potential across the resistor 35, which charges up the condenser 73 connected to the control grid of cathode follower 75. The output from the cathode follower passes to the vario-losser 27 through control lead 77, and functions in the manner described by Bennett and Doba in the aforementioned article in the Transactions of the American Institute of Electrical Engineers to adjust the loss of the vario-losser 27. Accordingly, the output from the transformer 89 is reduced from a reference or calibrated value of about 13 decibels by an amount corresponding to the loss of the line. For example, if the input power to the control circuit amplifier 31 is down by 5 decibles, from that of the generator at station A, the power from the output terminals of the vario-losser circuit 27 will accordingly be reduced 5 decibels.

Meanwhile, during the period relay 39 is operated, a 1,000-cycle tone is transmitted by the generator 17 through the adjusted vario-losser circuit 27, the amplifier 91, the hybrid coil 11 and the line 9, which will be received and measured by the transmission measuring set 7 at office A. When the sending relay 39 operated, it opened the operating path of the relay 37, by disengaging contact 39*a* before the 1,000-cycle tone is applied through the closure of the contacts 39*b* and 39*c*. This is necessary in order to prevent operation of the relay 37 by the generator 17. The operation of the slow-operate relay 71 discharges the condenser 73, and releases the sending relay 39, thus conditioning the circuit for another measurement.

Figure 5:
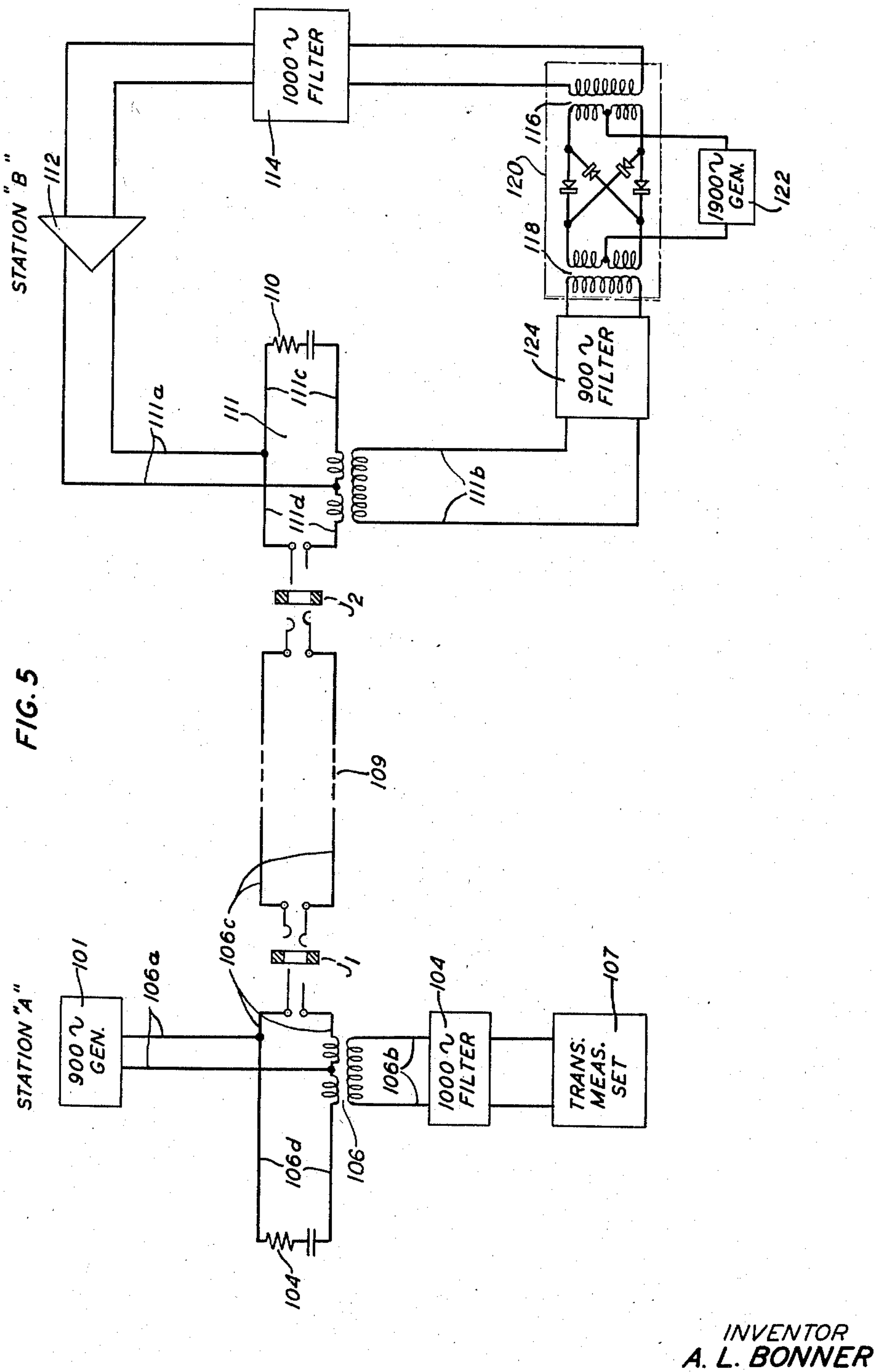
Fig. 5 shows a second embodiment of the invention in which the frequency of a sustained tone transmitted from station A is converted to another frequency at station B and returned again to station A.

Fig. 5 of the drawings shows an alternative form of the invention in which the round-trip loss measurement is made by tones of two different frequencies. It is apparent that the system which is about to be described can be applied for testing toll lines between switching centers in the manner indicated in Fig. 2. In accordance with this embodiment, a test tone of given frequency is transmitted from the control office A to the distant office B, where it is converted to a tone of slightly different frequency, and returned to office A. Inasmuch as the apparatus at station B is designed to have zero loss, the difference between the transmitted and received powers at office A represents the round-trip loss of the circuit. For the purposes of the present illustration, 900 cycles per second has been chosen as the frequency for the tone transmitted from station A; and 1,000 cycles as the converted frequency of the tone returned to station A from station B.

At station A, the hybrid coil 106 serves to isolate the 900-cycle generator 101 which is connected to its terminals 106*a*, from the transmission measuring set 107, which is connected to the conjugate terminals 106*b*. A 1,000-cycle filter 104 is included in the path to the measuring set 107, which filter is preferably designed to have a 40-decibel discrimination at 900 cycles, in order that a high loss reading in the measuring set 107 is not appreciably affected by the transmitted energy. Such a requirement can easily be met by using two filters in tandem, of a type such as commonly used in voice frequency telegraph systems. The second pair of conjugate terminals 106*c*, 106*d* are respectively connected to the test line 109 and a balancing network 104.

The circuit at office B includes a 900-cycle band-pass filter 124, which functions to receive the tone transmitted from station A, a modulator 120, which functions to shift the frequency from 900 to 1,000 cycles by modulating the input signal with a 1,900-cycle signal from the generator 122, a 1,000-cycle band-pass filter 114 the purpose of which is to reduce unwanted modulation products, and an amplifier 112 which compensates for the signal loss introduced by the circuit elements at station B. The hybrid coil 111 serves to isolate the output of the amplifier 112 from the input to the 900-cycle band-pass filter 124, respectively connected to the terminals 111*a* and 111*b*. The second set of conjugate terminals 111*d* and 111*c* are respectively connected to the line 109 and balancing network 110.

Certain considerations which enter into the design of the circuit are the reduction of interference with the measurement from the unwanted modulation products, and further, avoidance of self-oscillation in the loop at station B.

The double balanced type of modulator indicated as elements 120, on Fig. 5, which is coupled to the output terminals of the 900-cycle filter 124 through the balanced transformer 118, and to the input terminals of the 1,000-cycle filter 114 through the transformer 116, is preferably of a type such that all of the unwanted modulation products in the frequency band near 1,000 cycles per second are attenuated at least 25 decibels. Accordingly, the filtering provided need only be designed to suppress the upper sideband.

Taking into consideration the feedback around the loop at office B, the 900-cycle filter 124 should preferably have sufficient discrimination at a frequency of 1,000 cycles per second and the 1,000-cycle filter 114 should preferably have sufficient discrimination at 900 cycles per second, to keep feedback energy of the measuring frequency from affecting the measurement. Desirable design criterions provide conditions such that the sum of the discriminations mentioned should be of the order of 20 decibels, and that the sum of the losses of the filters 124 and 114 should be at least 10 decibels at all frequencies in the pass band of the amplifier 112, in order to insure an ample margin for avoiding oscillation of the circuit.

Although the invention has been described with reference to certain specific embodiments, it is apparent that the invention may be embodied in other forms also.

What is claimed is:

1. In an electrical system including a two-way signal transmission path extending between a first terminal and a second terminal, the method which comprises transmitting a first tone over the signal transmission path from said first terminal to said second terminal, utilizing the received energy of said first tone at said second terminal to adjust the amplitude of a second tone initiated at said second terminal, returning said second tone over the signal transmission path to said first terminal, and measuring the amplitude of said second tone at said first terminal with reference to the transmitted amplitude of said first tone.

2. In an electrical transmission system including a two-way path for signal transmission, a first source of tone connected to said path at said first terminal, a second source of tone connected to said path at said second terminal, a receiver connected to said path at said second terminal for receiving said first tone over said path from said first terminal, a control device connected to said receiver and said second source at said second terminal for controlling the amplitude of said second tone transmitted over said path to said first terminal in accordance with the received amplitude of said first tone, a receiver connected to said path at said first terminal for receiving said second tone transmitted over said path, and a measuring device connected to said receiver at said first terminal for measuring the received amplitude of said second tone with reference to the transmitted amplitude of said first tone.

3. In an electrical transmission system including a two-way path for signal transmission, a source of tone of first frequency connected to said path at said first terminal, means connected to said path at said second terminal for receiving and shifting the frequency of the tone received from said first terminal to a second frequency, an amplifier connected to said frequency shifting circuit adjusted to compensate for the loss therethrough, means connected to said path at said second terminal for transmitting said second frequency tone to said first terminal, and a measuring device connected to said path at said first terminal for measuring the amplitude of said second tone received at said first terminal with reference to the transmitted amplitude of said first frequency tone.

4. In an electrical transmission system including a two-way path for signal transmission between a control station and an auxiliary station, a generator of a first spurt of pilot tone for connection to said path at said control station, means connected to said path at said auxiliary station for receiving and registering the amplitude of said first spurt tone, a generator of a second spurt tone connected to said path at said auxiliary station, means connected to the last said generator and under control of said receiving and registering means for controlling the amplitude of said second spurt tone impressed on said path in accordance with the received amplitude of said first spurt tone at said auxiliary station, and a measuring device connectable to said path at said control station for measuring the received amplitude of said second spurt tone with reference to the transmitted amplitude of said first spurt tone.

5. An electrical transmission system in accordance with claim 4 in which said first and said second spurts of tone are of the same frequency.

6. A system for measuring the loss of an electrical transmission line, said line connecting a control terminal and an auxiliary terminal, said system comprising at said control terminal: a first generator of a given frequency pilot tone, a transmission measuring set, and switching means for alternatively connecting said first generator or said measuring set to said line, at said auxiliary terminal: receiving and storing means connected to said line for receiving the pilot tone from said control station and storing energy proportional to the amplitude of the received signal, a second generator of a given frequency pilot tone, and a loss-adjusting circuit connected to said receiving and storing circuit, said generator and said line, said loss-adjusting circuit responsive to energy received from said storing circuit to control the output energy of the pilot signal impressed on said line by said second generator for return transmission to said control station.

7. A system for measuring round-trip loss in an electrical transmission system in accordance with claim 6 in which amplifying means having a gain sufficient to compensate for the loss through said loss-adjusting circuit is interposed between said loss-adjusting circuit and connection to said line.

8. A system for measuring the round-trip loss of an electrical transmission line, said line connecting a control terminal and an auxiliary terminal, said system comprising at said control terminal: a first generator of a given frequency tone, a transmission measuring set, switching means for alternatively connecting said first generator or said measuring set to said line, at said auxiliary terminal: a hybrid junction having a pair of terminals in conjugate relation, and a third terminal connected to said line, receiving and storing means connected to one of the terminals of said pair for receiving the pilot tone from said control station and storing energy proportioned to the amplitude of the received signal, a second generator of a pilot tone of said given frequency, a loss-adjusting circuit connected between said second generator and the other terminals of said pair and responsive to energy received from said holding circuit to control the output energy of the pilot tone impressed on said line by said second generator.

9. A system for measuring the round-trip loss of an electrical transmission line, said line connecting a control station and an auxiliary station, said system comprising at said control station: a generator of pilot tone of a first frequency, a transmission measuring set, a hybrid junction having a first and a second set of terminals in conjugate relationship which are respectively connected to said generator of a first frequency pilot tone and said transmission measuring set, and a third set of terminals connected to said line, at said auxiliary station: a hybrid junction having a first set of terminals connected to said line, and a second and a third set of terminals in conjugate relation, a modulator having its input terminals connected to said line through a path which includes said second set of terminals of said hybrid junction, a generator connected to impress a modulating frequency on said modulator for converting the frequency of said pilot tone from said first frequency to a second frequency, and amplifying means connected to receive the modulated output energy from said modulator, said amplifying means having a gain such that it compensates for the net loss through said auxiliary station, and said amplifier connected to said line through a path which includes said third set of terminals of said hybrid junction.

10. A system for measuring the round-trip loss of an electrical transmission line, said line connecting a control station and an auxiliary station, said system comprising at said control station: a hybrid junction having a first and a second set of terminals in conjugate relation, and a third set of terminals of said hybrid junction connected to said line, a generator of a pilot tone of a first frequency connected to said first terminals of said hybrid junction, a transmission measuring set, a filter having its output terminals connected to the terminals of said transmission measuring set and its input terminals connected to the second set of terminals of said hybrid junction, said filter having a pass frequency which corresponds to a second frequency of said pilot tone, at said auxiliary station: a hybrid junction having a first set of terminals connected to said line and a second and a third set of terminals in conjugate relation, a filter having a pass frequency corresponding to the first frequency of said pilot tone connected to said line through said second terminals, a modulator connected to receive input energy through said filter, a generator connected to impress a modulating frequency on said modulator for converting the frequency of said pilot tone to a second frequency, a filter connected to receive output energy from said modulator, said filter having a pass band equal to said second frequency of said pilot tone, and amplifying means connected to receive the modulated output energy through said filter, said amplifying means having gain such that it compensates for the net loss through said auxiliary station including said modulator, and said amplifier connected to said line through a path which includes said third set of terminals of said hybrid junction.

11. In a system including a two-way toll telephone transmission circuit interconnecting two geographically separated points A and B, the method of transmission measurement which comprises applying to said circuit at A a first tone current of predetermined fixed strength, receiving said tone current from said circuit at B, generating at B a second tone current of predetermined fixed strength and applying said second tone current to said circuit at B, modifying the strength of said second tone current, as so applied, under the control of said received first tone and to an extent uniquely determined by the strength of said received first tone, selectively receiving said second tone current from said circuit at A, and measuring the strength thereof.

12. In a system including a two-way toll telephone transmission circuit interconnecting two geographically separated points A and B, the method of measuring transmission loss which comprises applying to said circuit at A a first test signal of predetermined fixed strength, receiving said test signal from said circuit at B, generating at B a second test signal of predetermined fixed strength, applying said second test signal to said circuit at B, modifying the strength of said second test signal, as so applied, under the control of said received first test signal and to an extent fixed by the strength of said received first test signal, selectively receiving said second test signal from said circuit at A, measuring the strength thereof, and measuring substantially contemporaneously the transmission loss of said circuit in the direction B to A, whereby the transmission loss of said circuit in the opposite direction can be evaluated.

13. In a system including a two-way toll telephone transmission circuit interconnecting two geographically separated points A and B, the method of transmission measurement which comprises applying to said circuit at A a first tone current of predetermined fixed strength, receiving said tone current from said circuit at B, applying to the circuit at B a tone current of a strength having a predetermined relation to the strength of the received first tone, selectively receiving said second tone current from said circuit at A, and measuring the strength thereof.

ARTHUR L. BONNER.

References Cited in the file of this patent

UNITED STATES PATENTS

| Number | Name | Date |
|---|---|---|
| 2,214,130 | Green et al. | Sept. 10, 1940 |
| 2,281,508 | Lundstrom | Apr. 28, 1942 |
| 2,322,330 | Vroom | June 22, 1943 |
| 2,337,540 | Burgess | Dec. 28, 1943 |